US011100553B2

(12) United States Patent
Bidgoli

(10) Patent No.: US 11,100,553 B2
(45) Date of Patent: Aug. 24, 2021

(54) CUSTOMIZED DEAL GENERATION

(71) Applicant: LivingSocial, Inc., Washington, DC (US)

(72) Inventor: Mehrdad Bidgoli, San Francisco, CA (US)

(73) Assignee: LivingSocial, Inc., Washington, DC (US)

( * ) Notice: Subject to any disclaimer, the term of this patent is extended or adjusted under 35 U.S.C. 154(b) by 207 days.

(21) Appl. No.: 16/352,908

(22) Filed: Mar. 14, 2019

(65) Prior Publication Data
US 2019/0303958 A1 Oct. 3, 2019

Related U.S. Application Data

(63) Continuation of application No. 13/926,513, filed on Jun. 25, 2013, now Pat. No. 10,275,786.

(51) Int. Cl.
*G06Q 30/00* (2012.01)
*G06Q 30/06* (2012.01)

(52) U.S. Cl.
CPC .............................. *G06Q 30/0623* (2013.01)

(58) Field of Classification Search
CPC . G06Q 30/00; G06Q 30/0601; G06Q 30/0611
See application file for complete search history.

(56) References Cited

U.S. PATENT DOCUMENTS

| 8,175,914 B1* | 5/2012 | Benson ............. G06Q 30/0275 705/14.71 |
| 8,473,339 B1* | 6/2013 | McKennon ............ G06Q 30/02 705/14.1 |
| 2005/0033641 A1* | 2/2005 | Jha ......................... G06Q 30/02 705/14.53 |

(Continued)

OTHER PUBLICATIONS

Wu, Xiaoyuan, and Alvaro Bolivar. "Predicting the conversion probability for items on C2C ecommerce sites." Proceedings of the 18th ACM conference on Information and knowledge management. 2009. (Year: 2009).*

(Continued)

*Primary Examiner* — Christopher B Seibert
(74) *Attorney, Agent, or Firm* — Alston & Bird LLP

(57) ABSTRACT

A server receives a request for a deal from a client device of a merchant, the request for a deal including a merchant identifier. The server then accesses merchant information based on the merchant identifier, the merchant information including a merchant category and a merchant location. Additionally, the server obtains a set of candidate deals based on the merchant category and merchant location. The server then obtains historical information for each candidate deal, the historical information corresponding to one or more conversion rates of the candidate deal when the candidate deal was previously offered by one or more merchants. Next, the server determines a predicted conversion rate for each candidate deal, based on the historical information for the respective candidate deal and selects a deal based on the predicted conversion rates for the set of candidate deals. Lastly, the server communicates data corresponding to the selected deal to the client device, the data including the predicted conversion rate for the selected deal.

18 Claims, 7 Drawing Sheets

(56) References Cited

U.S. PATENT DOCUMENTS

| | | | | |
|---|---|---|---|---|
| 2006/0212350 A1* | 9/2006 | Ellis | ................ | G06Q 30/0254 |
| | | | | 705/14.41 |
| 2008/0275771 A1* | 11/2008 | Levine | ................ | G06Q 20/20 |
| | | | | 705/14.64 |
| 2011/0004509 A1* | 1/2011 | Wu | ................ | G06Q 10/06375 |
| | | | | 705/7.37 |
| 2012/0166267 A1* | 6/2012 | Beatty | ................ | G06Q 30/0219 |
| | | | | 705/14.21 |
| 2012/0310764 A1* | 12/2012 | Sinsheimer | ................ | G06Q 30/06 |
| | | | | 705/26.2 |
| 2014/0201126 A1* | 7/2014 | Zadeh | ................ | A61B 5/165 |
| | | | | 706/52 |
| 2014/0236710 A1* | 8/2014 | Nashed | ................ | G06Q 30/0246 |
| | | | | 705/14.45 |

OTHER PUBLICATIONS

Notification of Transmittal of the International Search Report and the Written Opinion of the International Searching Authority, or the Declaration, dated Sep. 26, 2014 in corresponding International Application No. PCT/US2014/043792, 10 pages.

Moe, Wendy W., and Peter S. Fader. "Dynamic conversion behavior at e-commerce sites." Management Science 50.3 (2004): 326-335. (Year: 2004).

* cited by examiner

CUSTOMIZED DEAL GENERATION

This application is a continuation of U.S. patent application Ser. No. 13/926,513, titled "Customized Deal Generation" filed Jun. 25, 2013, which is hereby incorporated by reference.

TECHNICAL FIELD

This specification generally relates to generating deals customized to customer type.

BACKGROUND

Computer systems and communication networks, such as the Internet, enable merchants to offer various deals on products and services to customers. However, merchants may not have the ability to generate custom deals targeted to particular groups of customers.

SUMMARY

The present disclosure describes a deal engine that provides merchants with the ability to generate custom deals targeted to particular customers. These custom deals may be generated based on information about, for example, the merchant, the type of targeted customer, and/or historical information about the types of deals to be offered.

In general, one aspect of the subject matter described in this specification may include the actions of receiving, at a server and from a client device of a merchant, a request for a deal, the request including a merchant identifier. The actions then include accessing, at the server, merchant information based on the merchant identifier, the merchant information including a merchant category and a merchant location. Then the actions include obtaining, at the server, a set of candidate deals based on the merchant category and the merchant location. For each candidate deal, the actions include obtaining, at the server, historical information on the respective candidate deal, the historical information corresponding to one or more conversion rates of the candidate deal when the candidate deal was previously offered by one or more merchants and, determining, at the server, a predicted conversion rate based on the historical information for the respective candidate deal. The actions then include selecting, at the server, a deal based on the predicted conversion rates for the set of candidate deals. Finally, the actions include communicating, from the server, data corresponding to the selected deal to the client device, the data including the predicted conversion rate for the selected deal.

In some implementations, actions may involve accessing, at the server, merchant information based on the merchant identifier, the merchant information comprising a merchant category, a merchant location, and one or more tags for the merchant and obtaining, at the server, a set of candidate deals based on the merchant category, the merchant location, and the one or more tags for the merchant.

Some implementations may involve accessing, at the server, merchant information based on the merchant identifier, the merchant information comprising a merchant category, a merchant sub-category, a merchant location, and one or more tags for the merchant and obtaining, at the server, a set of candidate deals based on the merchant category, the merchant sub-category, the merchant location, and the one or more tags for the merchant.

Some implementations may involve obtaining, at the server, information corresponding to one or more target customer demographics and obtaining, at the server, historical information on the respective candidate deal, the historical information corresponding to one or more conversion rates of the candidate deal when the candidate deal was previously offered by one or more other merchants to one or more of the target customer demographics.

In some implementations, actions may include selecting, at the server, a deal for each of the one or more target demographics based on the predicted conversion rates for the set of candidate deals and communicating, from the server, data corresponding to the selected deals for each of the one or more target demographics to the client device. Some implementations may involve selecting, at the server, a deal having the highest predicted conversion rates from the set of candidate deals.

In some implementations, actions may include determining, at the server, a predicted revenue for the selected deal and communicating, from the server, data corresponding to the selected deal to the client device, the data including the predicted conversion rate for the selected deal and the predicted revenue for the selected deal.

Other features may include corresponding systems, apparatus, and computer programs, configured to perform the actions of the methods, encoded on computer storage devices.

The details of one or more implementations are set forth in the accompanying drawings and the description, below. Other potential features and advantages of the disclosure will be apparent from the description and drawings, and from the claims.

DESCRIPTION OF DRAWINGS

Like reference symbols in the various drawings indicate like elements.

DETAILED DESCRIPTION

Various implementations relate to a deal engine that generates a customized deal for a merchant. The deal engine can generate a deal to be offered by the merchant based on based on information about, for example, the merchant, the type of targeted customer, and/or historical information about the types of deals to be offered. The targeted customer types may include, for example, prospective customers, existing customers and/or loyal customers.

Systems and methods that may include this and other implementations are described below. First, a general description of example implementations will be described. Then, more detailed aspects of exemplary features are described.

As described herein, a deal is a monetary discount on a product (e.g., food), service (e.g., cleaning services, spas, or transportation), or a group of products and/or services offered for sale by a merchant.

Figure 1:
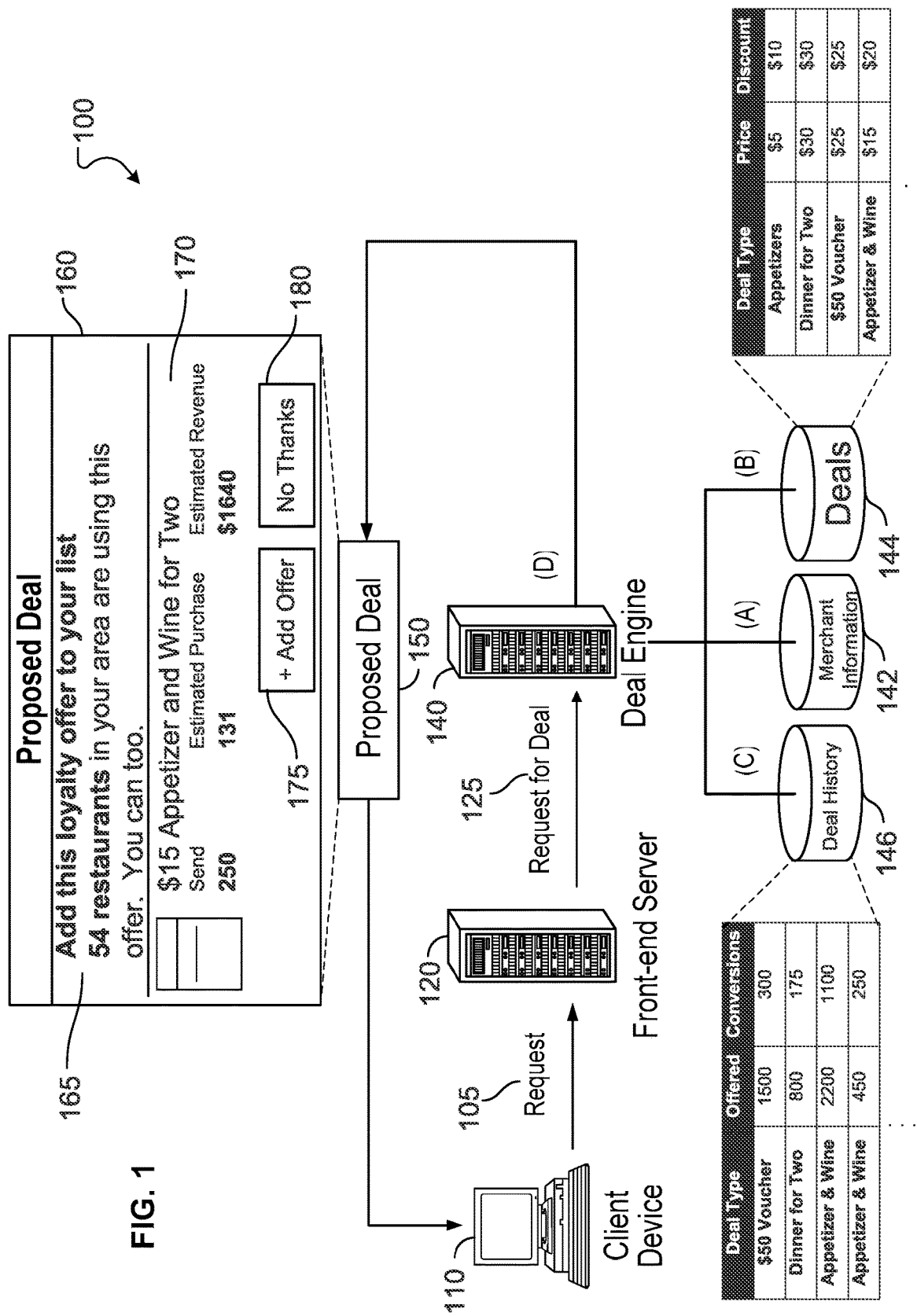
FIG. 1 illustrates an example system for generating a customized deal for a merchant.

FIG. 1 shows an example system 100 for generating a proposed deal for a merchant. In operation, a merchant may operate the client device 110 to make a web browser request 105 to the front-end server 120. Next, the front-end server 120 requests a deal from the deal engine 140. The deal engine 140 accesses deal history information 146, merchant information 142, and deal information 144 to generate a proposed deal 150 based on the accessed information.

Each component and entity involved with the system 100 will now be described in more detail. While described below for example purposes as being separate servers, in some implementations, the front end server 120 and the deal engine 140 may be hosted on the same server or group of servers.

In some implementations, the request for deal 125 is sent to a deal engine 140 that may be a server external to the front-end server. In other implementations, the deal engine 140 may be located at the front-end server.

The client device 110 of a merchant can be used to communicate with the front-end server 120. An example of a client device is an electronic device that is under control of a merchant and that is capable of communicating with the front-end server 120 via a network, including but not limited to a mobile phone, smart phone, PDA, music player, e-book reader, tablet computer, laptop or desktop computer, or other stationary or portable device, that includes one or more processors and non-transitory computer readable storage media. A network is a distributed computer system, computer network system, website, social network etc. A network may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), or General Packet Radio System (GPRS).

In an example operation, the client device 110 may be operated by a merchant to navigate a website of a deal system that is hosted on the front end server 120. The front-end server 120 includes electronic and digital components, including hardware needed to implement the instructions and read/access data. The server includes a communication mechanism that is able to communicate with a network.

The client device 110 may make various requests 105 to the front end server 120 while navigating the website of the deal system, for example via hypertext transfer protocol (HTTP). The website may provide various features related to creating and managing deals that may be offered by the merchant. When a merchant performs certain actions on the website such as, for example, requesting a new deal, logging into the website, or viewing existing deals, the front end server 120 may interpret this action as a request for generating a deal 125.

Upon receiving a request for a deal 125, the deal engine 140 then generates a customized deal and provides the deal 150 back to the client device 110 via the front end server 120. In particular, the deal engine 140 accesses merchant information 142 in step (A), deal information 144 in step (B), and deal history information 146 in step (C). The deal engine 140 then transmits the proposed deal 150 back to the client device in step (D). In some implementations, the merchant information, the deal history information, and deal information may be stored at the deal engine 140. In other implementations, merchant information, deal history information, and deal information may be stored in a storage device external to the deal engine 140.

The request for a deal 125 received by the deal engine 140 may include a merchant identifier which may be used to identify the merchant making the request. For example, the front end server 120 may determine an identifier of the merchant currently logged on to the website, for example using cookies, and pass this identifier to the deal engine 140. In step (A), the deal engine 140 may use the merchant identifier to access merchant information 142 about the identified merchant. In some implementations, the merchant information 142 may be stored at the deal engine 140. In other implementations, the merchant information 142 may be stored at a server external to the deal engine 140. The merchant information 142 may include various information such as, for example, the location of the merchant, customers of the merchant, merchant category information, and/or tags associated with the merchant. For example, a merchant may have a category of "restaurant," "spa," or "nightclub." In some implementations, the merchant information may include a merchant sub-category, for example, a Chinese restaurant, an Italian restaurant, or a sushi restaurant. As described herein, a tag identifies a particular feature or offering of a merchant, such as, for example, take-out, delivery, valet parking services, casual dinner, fine dining, or child-friendly.

Next, in step (B), the deal engine 140 accesses deal information 144. In some implementations, the deal information 144 may be stored at the deal engine 140. In other implementations, the deal information may be stored at a server external to the deal engine 140. The deal information 144 may include deal type information, deal price information and the discount associated with each deal type offered. In some implementations, the deal type may be a complimentary deal, for example, a free appetizer with the purchase of an entrée, or a voucher for a free drink. In other implementations, the deal type may be a discount deal, for example, a deal for 25% off a purchase. In yet another implementation, the deal type may be a social discount, for example, a deal for a free meal when the customer invites two friends. For the example, illustrated in FIG. 1, the deal information 144 may be stored in a table that includes at least three columns. The first column may include the type of deal, the second column may include a price of the deal, and the third column may include a discount for the deal. As shown in the example table of FIG. 1, the deal information 144 includes an appetizers deal with a price of $5 and a discount of $10, a dinner for two deal with a price of $30 and a discount of $30, a $50 voucher with a price of $25 and a discount of $25, and an appetizer and wine deal with the price of $15 and a discount of $20. In some implementations, the deal information 144 may include information on types of deals that have been used by merchants in the past. In other implementations, the deal information may include information on types of deals that have been used in the past by the merchant requesting the deal. Alternatively or in addition, the deal information 144 may include information on new types of deals that may not have been used by merchants in the past.

Then, in step (C), the deal engine 140 accesses deal history information 146. In some implementations, the deal history information 146 may be stored at the deal engine. In other implementations, the deal history information may be stored at a server external to the deal engine. The deal history information 146 may include the type of deal offered for purchase to customers by merchants in the past along with information describing how well the deal performed when offered by the merchants. This information may be stored in a table such as shown in FIG. 1.

For example, the deal history information 146 may be stored in a table having at least three columns: a first column describing a deal type, a second column describing a number of deals offered, and a third column describing the number of conversions for conversion rate of the deal. As described herein, a conversion may correspond to a purchase of a deal by a customer, and the conversion rate may correspond to a ratio between a number of purchases by customers of a deal and the number of customers offered the deal. Each row in the table may describe a specific instance of the deal type being offered by a particular merchant such that any given deal type may include multiple entries by multiple merchants. For example, as illustrated in the example table of FIG. 1, previously offered deals include: a $50 voucher deal that was offered to 1500 customers and purchased by 300 customers (e.g., 300 conversions corresponding to a conversion rate of 0.2); a dinner for two deal that was offered to 800 customers and purchased by 175 customers; an instance of an appetizer and wine deal that was offered to 2200 customers and purchased by 1100 customers; and another instance of an appetizer and wine deal that was offered to 450 customers and purchased by 250 customers. In some implementations, the deal history information 146 may also include various other information such as, for example, the revenue acquired from the sale of a deal, the identity of merchants who used the deal in the past, a number of redemptions of purchase deals, and/or the date or dates when the deal was offered.

In step (D), the deal engine 140 generates a proposed deal 150 and provides the proposed deal to the client device 110 via the front end server 120. As described below, the proposed deal 150 is generated by the deal engine based on the deal information, merchant information and deal history information. The proposed deal 150 may be shown on a webpage 160 as illustrated in FIG. 1. The webpage 160 may include a notification 165 that includes information about other merchants offering similar deals to customers (e.g., "54 restaurants in your area are using this offer. You can too."). The webpage 160 also includes a description 170 of the deal being offered. For the example, as illustrated in FIG. 1, the proposed deal is a $15 Appetizer and wine for two deal. In some implementations, the deal description may include the number of deals to be sent (e.g., 250), a number of deals predicted to be purchased (e.g., 131), and estimated revenue for the proposed deal based on the number of deals predicted to be purchased in the cost structure of the proposed deal 150. The estimated revenue for the proposed deal also may be based on the deal type. For example, a discount deal may have a higher estimated revenue than a social discount deal. The proposed deal may also include a button 175 to add the offer to the deals currently being offered by the merchant and a button 180 to decline the proposed deal.

Figure 2:
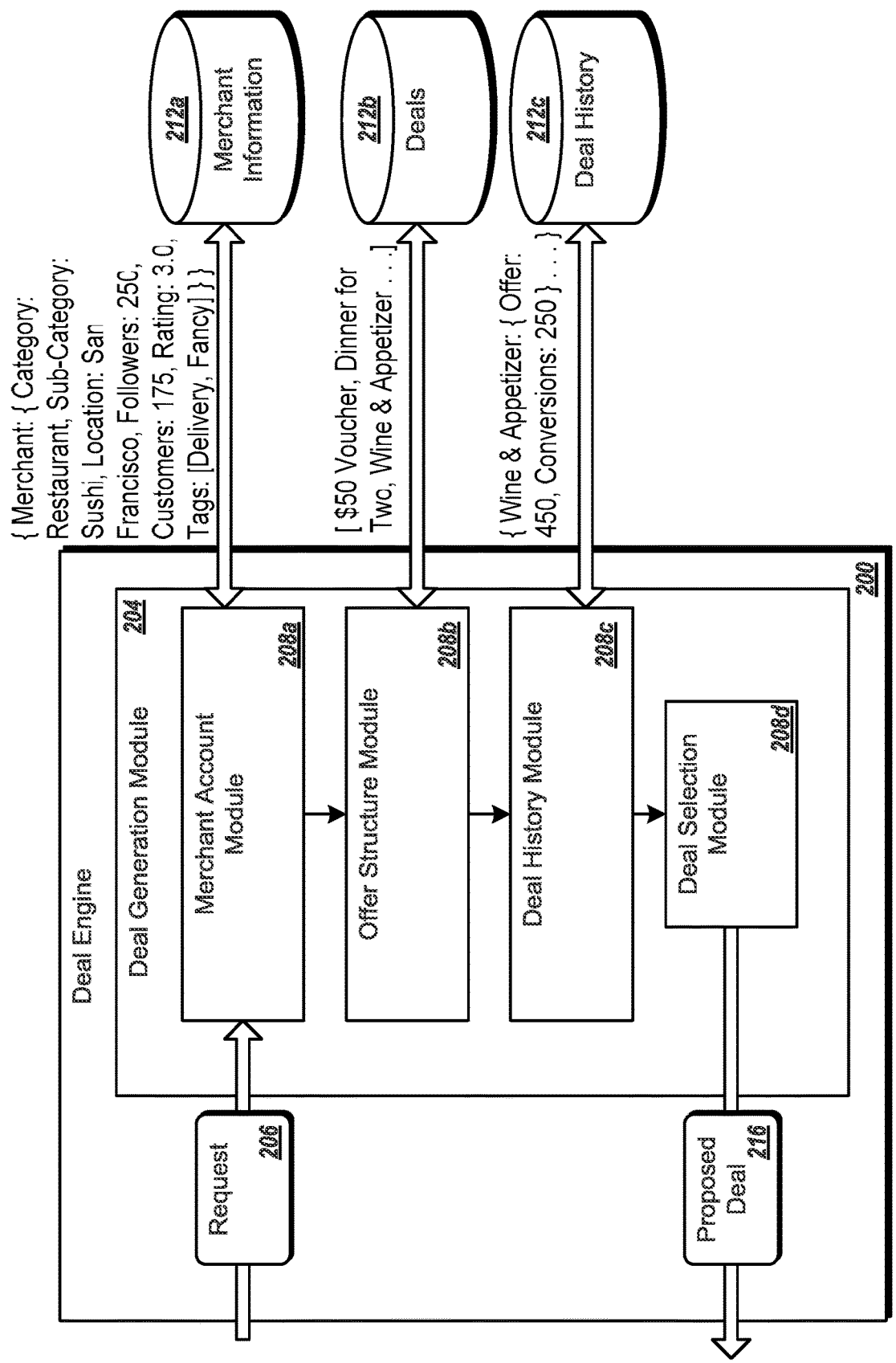
FIG. 2 illustrates an example deal engine for generating a customized deal.

FIG. 2 illustrates an example deal engine 200 for generating a customized deal. Initially, a request for a deal 206 is received by the deal engine 200. The deal engine 200 processes the received request and generates a proposed deal 216 to be transmitted to the client device of the merchant. The deal engine 200 includes a deal generation module 204, which further includes a merchant account module 208a, an offer structure module 208b, a deal history module 208c, and a deal selection module 208d. The deal engine 200 may retrieve and communicate data among these components using any suitable data structure or format such as, for example, an array, a collection of objects, an extensible markup language (XML) file, a JavaScript object notation (JSON) file, or any combination of these.

Upon receiving the request 206, the merchant account module 208a retrieves merchant information from a storage location 212a. The storage location 212 may be, for example, a database or a flat file. The request for a deal 206 may include a merchant identifier that can be used to identify the merchant requesting the deal. The merchant information may include a merchant category and/or subcategory (e.g., sushi), merchant location (e.g., San Francisco), a number of followers of the merchant (e.g., 250), a number of customers of the merchant (e.g., 175), a rating of the merchant (e.g., 3.0), and tags describing the offerings of the merchant (e.g., delivery, fancy). In some implementations, the rating of the merchant stored in the merchant information may be ratings information about the merchant collected from users of the deal engine 200. In other implementations, the rating of the merchant stored in the merchant information may be ratings information about the merchant received from an external website that rates merchants and services. The merchant information may also include information about the merchant extracted from a profile associated with the merchant on a social media website. For example, the information may include the number of customers that may follow a merchant on a social media website. Another example may include the number of the number of "likes" on a merchant's social media profile. In some implementations, the merchant information may include information describing a merchant's products, services, costs, pricing, and/or profit margins.

The merchant account module 208a may then provide the information about the merchant requesting the deal to the offer structure module 208b. The offer structure module 208b uses the merchant information received from the merchant account module 208a to retrieve a collection of potential deals from storage location 212b, which may be, for example, a database or a flat file. For example, as illustrated in FIG. 2, the offer structure module 208b retrieves a $50 voucher deal type, a dinner for two deal type, and a wine an appetizer deal type. In some implementations, the offer structure module 208b may also obtain pricing information associated with each deal type.

In some implementations, the offer structure module 212b may access deal information based on the merchant category and merchant sub-category. For example, the offer structure module may access information on deal types typically used within a merchant category and/or sub category. For example, for a merchant in the spa category, the deal type may include half off pedicure and free facial with purchase of a pedicure. For another example, a merchant in the sports category, the deal type may include four tennis lessons for the price of one and buy one get one half off on soccer game tickets. In some implementations, the deal engine 200 may generate a variety of generic deal types and store a collection of the generic deal types. For example, the deal engine may generate a half off deal, a buy one get one half off deal a buy one get one free deal. In some implementations, the deal engine 200 may generate generic complimentary deals, generic discount deals, and/or generic social discount deals and store a collection of the generic deal types.

The deal type accessed by the offer structure module may also be influenced by merchant sub-category. For example, for a merchant in a restaurant category and a fine dining subcategory, the deal type may include half off a bottle of wine. On the other hand, for a merchant in a restaurant category but in a fast food subcategory, the deal type may include half off meal, or free fountain soda with meal purchase. The deal information accessed by the offer structure module may also include the price of the deal. For example buy one entrée get one free for fifteen dollars. The offer structure module may receive one or more deal types for a specified merchant category or sub-category. In some implementations, the offer structure module receives a wide array of deal types. Tags associated with the merchant may also be used as a signal for determining which deals the offer structure module 208b retrieves from the storage device 212b. For example, if a merchant is a restaurant associated with a "delivery" tag, the deals retrieved by the offer structure module 208b may include a free delivery deal.

The offer structure module 208b may then provide the retrieved collection of deals to the deal history module 208c. The deal history module 208c then uses the deal information received from the offer structure module to access deal history information from storage device 212c, which may be, for example, a database or flat file.

The deal history information includes information describing historical instances in which specific deals were offered. For example, each entry of the deal history information may include a date or dates, the type of deal offered to customers using the deal engine, the number of customers offered the opportunity to purchase the deal in the past (e.g., the estimated send), and/or the conversion rate (e.g., the number of conversions for a specific deal when offered by a merchant in the past). Some implementations may also include information describing redemptions, i.e., customers who purchased the deal and then presented the deal to the merchant. Some implementations may also include information identifying categories of customers who were offered each deal. In some implementations, the deal history module 208d may access deal history information for each deal type that is specific to the category and subcategory of the merchant requesting the deal. In other implementations, the deal history module accesses deal history information for deal types that have history information. For example, some deal types provided to the deal history module may not have been used by any merchant in the past and therefore no deal history information may be available for the deal type. In these implementations, the deal history module may predict values for the conversion rate of a deal based on deal history information for one or more similar deals. Some implementations may include information identifying geographical locations where the deal was offered.

The deal history module 208c then provides the deal history information to the deal selection module 208d. The deal selection module 208d then selects one or more deals based on a variety of criteria. These criteria may include, for example, predicted conversion rate, predicted redemption rate, number of offers, predicted revenue, predicted profit, or any suitable combination of these.

In some implementations, the deal selection module 208d selects a deal based on the highest predicted conversion rate or rates, which can be determined based on the deal history information. For example, as illustrated in FIG. 2, a wine and appetizer deal included in the deal history information was offered to 450 customers and purchased by 250 customers, corresponding to a conversion rate of 0.55. Assuming that this was the highest conversion rate of any deal type in the deal history information, the deal selection module may select the wine and appetizer deal as the proposed deal 216. In some implementations, the deal selection module 208d may average or combine information regarding the same deal type. For example, if the wine and appetizer deal was offered on multiple occasions, the conversion rate may be based on the average conversion rate for the wine and appetizer deal. In implementations where the deal history information includes information identifying categories of customers, the predicted conversion rate may be determined for different categories of customers (e.g., new customers, existing customers, and/or loyal customers). Such implementations may produce different proposed deals for the different categories of customers based on different deals having higher conversion rates for specific categories of customers.

In some implementations, the deal selection module 208d selects a deal based on the highest predicted redemption rate (e.g., customers who present the deal to the merchant after purchasing the deal or use the deal at the merchant). The redemption rates may also be determined based on deal history information that includes redemption data.

In some implementations, the deal selection module 208d selects a deal based on a number of customers who will be offered the deal. The number of customers may be for example, a maximum number of customers, a minimum number of customers, and/or a target number of customers. For example, a merchant may indicate a target number of customers in the request 206. Alternatively or in addition, the number of customers may be based on the number of followers the merchant has on a social media network, a number of customers who have previously purchased deals from the merchant, and/or a number of customers associated with the merchant's account.

In some implementations, the deal selection module 208d selects a deal based on predicted revenue. The predicted revenue may be, for example, predicted revenue from selling the deal to customers and/or predicted revenue from customers redeeming the deal. For example, the deal selection module may seek to maximize revenue or to obtain a target revenue for the deal. The revenue may be calculated based upon, for example, a number of customers who will be offered the deal in combination with the price of the deal (e.g., number of customers*price of the deal). As another example, the revenue may be calculated based upon a number of customers who will be offered the deal, the price of the deal, a predicted number of customers who will redeem the deal, and a predicted revenue from purchases made by the customers who redeem the deal. The predicted revenue from purchases may be determined based on cost, pricing, and/or profit margin information received in the merchant information 212a described above.

In some implementations, the deal selection module 208d selects a deal based on predicted profit. The predicted profit may be, for example, predicted profit from selling the deal to customers and/or predicted profit from customers redeeming the deal. For example, the deal selection module may seek to maximize profit or to obtain a target profit for the deal. The profit may be calculated based upon, for example, a number of customers who will be offered the deal in combination with the price of the deal (e.g., number of customers*profit margin of the deal). As another example, the profit may be calculated based upon a number of customers who will be offered the deal, the profit margin of the deal, a predicted number of customers who will redeem the deal, and a predicted profit margin from purchases made by the customers who redeem the deal. The predicted profit margin from purchases may be determined based on cost, pricing, and/or profit margin information received in the merchant information 212a described above.

In some implementations, the deal selection criteria may be based on deal history information specific to the merchant requesting a deal and the success of deals offered by the merchant in the past. For example, the deal selection module 208d may select a 50% off a purchase deal, which has been used previously by the merchant requesting the deal. The deal may have generated a high revenue and/or a high profit for the merchant in the past. The deal may have also had a high redemption rate when used by the merchant in the past. In some implementations, the deal selection module may select a deal only from the deals offered in the past by the merchant requesting the deal. In some implementations, the deal selection module may select a deal that may not have had a high revenue for other merchants, but may have had a high revenue in the past for the merchant requesting the deal.

In some implementations, the deals may be selected based on loyalty levels of the customers. For example, a deal may be proposed for existing customers and loyal customers. In further implementations, the deal selection module may select one deal and provide different terms proposed based on customer loyalty. For example, the deal selection module may select a buy one meal get one free deal for a merchant in the restaurant category and the price may be ten dollars for loyal customers and the price may be fifteen dollars for prospective customers.

Some implementations may take the geographic location of the merchant and the geographic location of deal history information into account when selecting proposed deals 216. For example, historical information on deals that were offered in the same or a nearby geographic location as the merchant may be weighted more heavily than historical information on deals that were offered in geographic locations distant from the merchant's location.

The deal selection process may be adapted to transition customers between the various demographic categories. For example, the target customer demographics may include prospective customers, existing customers, and loyal customers. The selection process may therefore be designed to convert prospective customers into existing customers, and to convert existing customers into loyal customers.

Upon selecting one or more proposed deals 216, the deal selection module 208d transmits the proposed deal or deals back to the client device of the merchant. For example, the proposed deals may be included in a webpage that is served back to the client device of the merchant via the front end server 120 as shown in FIG. 1.

Figure 3:
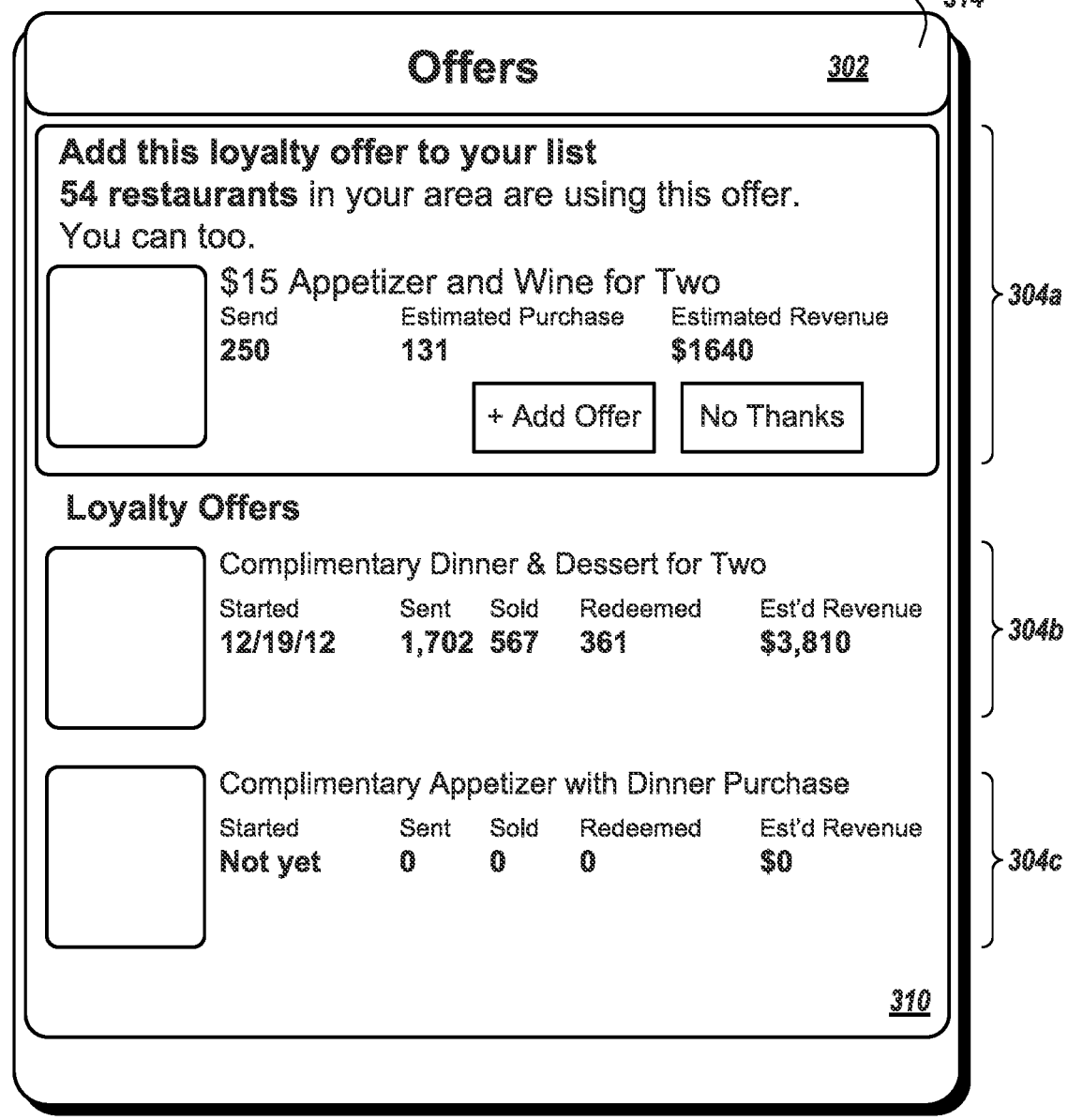
FIGS. 3-5 illustrate example user interfaces at a merchant's client device.
Figure 4:
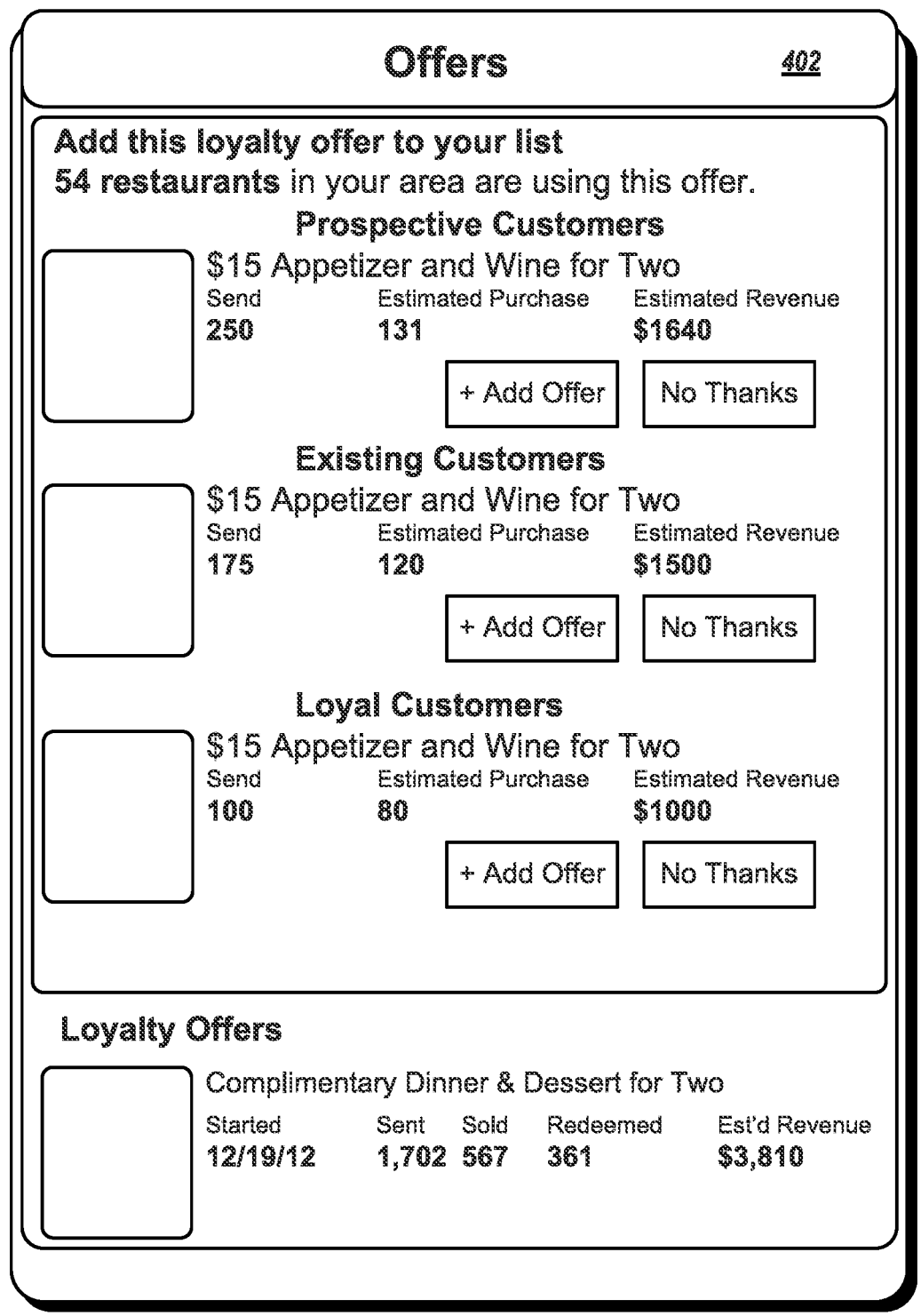
Figure 5:
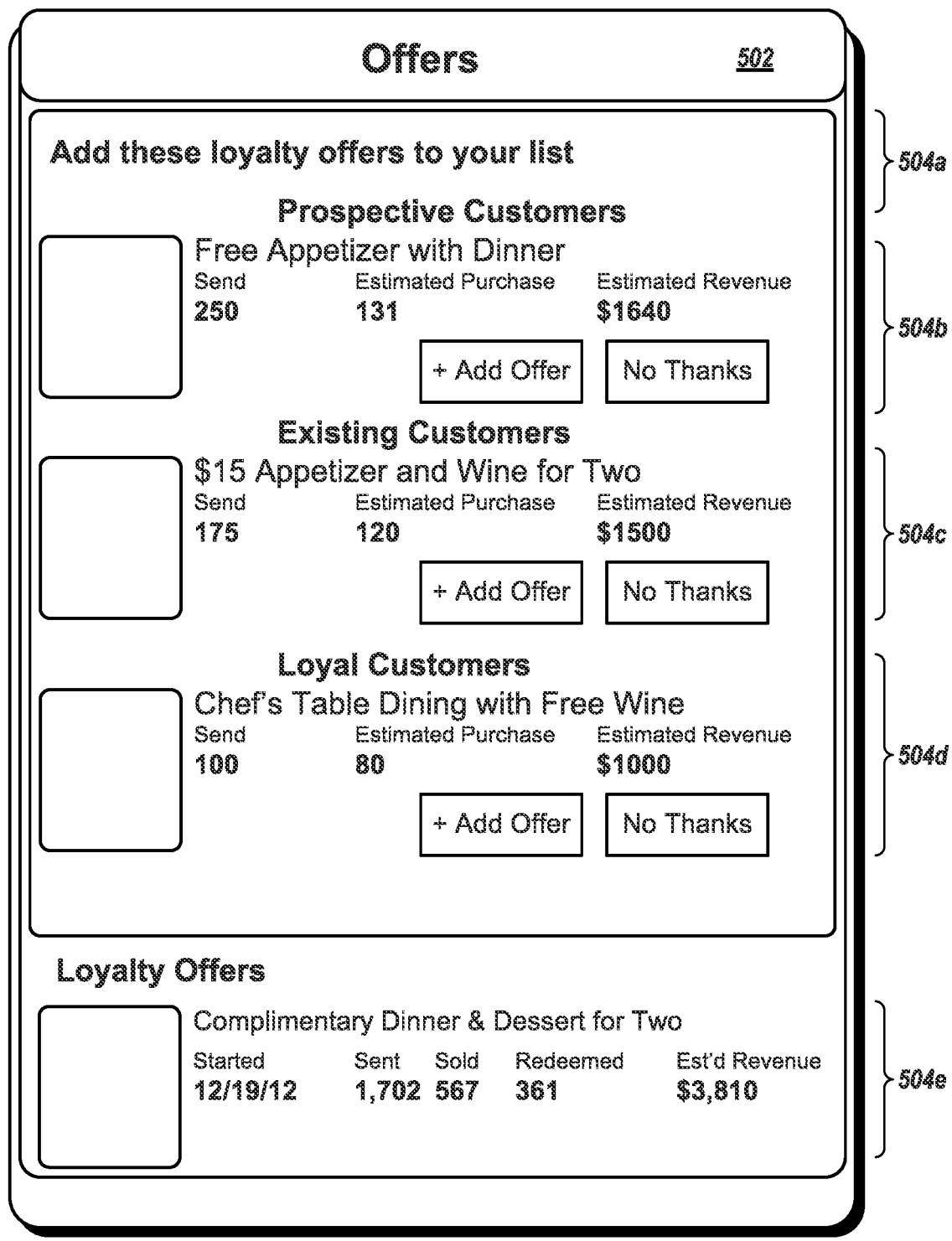

FIGS. 3-5 illustrate example user interfaces at a merchant's client device. In particular, FIG. 3 illustrates an example interface 300 that shows a list of offers presented to a specific merchant. The list of offers may include a loyalty offer 304a, that may be in use by other merchants in the same category, sub-category or location of the specific merchant. The loyalty offer may include the title of the deal being offered and the number of merchants that are presently running the loyalty offer. The loyalty offer may also include the estimated send for the deal. The estimated send may be the number of customers that may be extended the offer by the merchant. The estimated send may be generated by the deal engine based on the merchant information as described above, such as information extracted from a profile associated with the merchant on a social networking profile. In some implementations, the estimated send may be calculated based on the number of deals previously sold by the merchant requesting the deal. For example, the estimated send will be calculated to be 250 for a merchant that has sold 250 deals on a deal previously run by the merchant. Alternatively or in addition, the estimated send may be calculated based on the number of customers who have indicated an interest in the merchant requesting the deal on the website of the deal system. For example, the estimated send may be calculated to be 100 based on 100 customers following a merchant on the website of the deal system. Alternatively or in addition, the estimated send may be calculated based on the number of customers using the deal system, who may have set reminders to receive deals provided by the merchant. Alternatively or in addition, the estimated send may be calculated based on the number of followers the merchant has on Facebook, or the number of likes the merchant received by users on Facebook. The loyalty offer may include an estimated purchase for the deal, which may be calculated based on deal history data. The loyalty offer may also include estimated revenue for the deal. The estimated revenue is calculated based on the cost of the deal and the predicted purchases based on the deal history information.

In some implementations, the loyalty offer may be generated and presented automatically when a merchant visits a profile associated with the merchant on the deal engine website. For example, the deal engine may automatically generate a loyalty offer for a merchant based on the deals offered by a merchant in the past. In other implementations, the merchant may request a deal and the deal engine generates a deal based on the merchant information, deal and deal history information.

The list of offers may include offers 304b that are presently being run by the merchant. The offer information may include the name of the offer and the start date of the offer. The offer information may also include the number of customers that were sent the offer, the number of customers that purchased the offer and the number of customers who redeemed the offer thus far. The offer information also includes the estimated revenue from running the deal. The list of offers may also include a loyalty offer 304c that has not yet been offered to customers.

FIG. 4 illustrates an example merchant interface 400 that shows a list of offers 402 available to a specific merchant. The list of offers may include a loyalty offer 404a, that may be in use by other merchants in the same category, sub-category or location of the specific merchant. The loyalty offer may include proposed deals to different customers of different loyalty levels. For example, the loyalty deal may be generated for prospective customers, existing customers or loyal customers. In some implementations, the deal engine generates a proposed deal based on the accessed deal information, merchant information and deal history information. In the implementation illustrated in FIG. 4, the deal engine generates a deal for prospective customers 404b, a deal for existing customers 404c and a deal for loyal customers 404d. In some implementations, the deal proposed for prospective customers includes the estimated send, the estimated purchase and the estimated revenue. A prospective customer may, in some examples, be a customer who has visited a profile associated with the merchant on a social media webpage. For example, a user who visits the merchants' profile page on Facebook may be included in the estimated send for the prospective. In other examples, a prospective customer may be customers who use the deal engine to purchase deals. In some implementations, prospective customers may be customers who use the deal system to purchase deals. In other implementations, prospective customers may be customers who use the deal system and may have expressed interest in receiving deals from the merchant. The deal engine may access deal history information and merchant information to calculate an estimate send for each level of customer loyalty.

The deal engine may also calculate an estimated purchase for the deal generated for prospective customers. The deal engine access deal history information and uses the information to calculate the estimated number of customers who may purchase the deal. In some implementations, the deal engine may calculate the estimated purchase based on the conversion rate of a previously run similar deal. In some examples, the deal may have been used before by the merchant and the deal engine calculates the estimated purchase for the current deal based on the previous conversion rate. In some implementations, when the deal history information does not include conversion rate information on a specific type of deal, the deal engine may use a generic conversion rate to calculate the estimate purchase for the deal for prospective customers. In some examples, the generic conversion rate may be calculated as an average of the conversion rates of all deals generated by the deal engine in the past. The deal engine may also calculate estimated revenue for the deal for prospective customers. The estimated revenue may be based on the estimated purchase calculated by the deal engine for the deal.

The list of offers includes a deal generated for existing customer 404c. The offer information may include the name of the offer, the estimated send, the estimated purchase and the estimated revenue for the offer. The estimated send for prospective customers may be greater than the estimated send for existing customers. In some examples, existing customers may be customers who may have purchased information from the merchant in the past. The deal engine may calculate the estimated send for the deal for existing customers, the number of customers who may have actually purchased deals from a merchant in the past may often be less than the estimated send calculated for prospective customers. In some examples, prospective customers may be randomly selected users of the deal engine, so in many cases the estimated send for prospective customers is greater than the estimated send for existing customers.

The deal engine may also calculate an estimated purchase for the deal generated for existing customers. The deal engine accesses deal history information and uses the information to calculate the estimated number of customers who may purchase the deal. In some implementations, the deal engine may calculate the estimated purchase based on the conversion rate of a previously run deal for existing customers. In some implementations, when the deal history information does not include conversion rate information for a deal for existing customers, the deal engine may use a conversion selected from the deal history information based on a deal offered by the merchant to existing customers in the past. The deal engine may also calculate estimated revenue for the deal for existing customers. The estimated revenue may be based on the estimated purchase calculate by the deal engine for the deal.

The list of offers displayed to the user may also include a deal generated for loyal customers. The deal may include the estimated send, the estimated purchase and the estimated revenue for the deal. A loyal customer may be a customer who uses the deal engine frequently and may have bought one or more deals from a specific merchant. In some implementations, a loyal customer may be a customer who has satisfied a limit of deal purchases from a merchant. For example, a loyal customer may be a customer who has purchased five deals from a merchant. In other implementations, a loyal customer may a customer who has purchased a deal from a merchant within a certain time period. For example, a loyal customer may be a customer who has purchased a deal from the merchant within the last month. In yet another implementation, a loyal customer may be a customer who has satisfied a limit of deal purchases within a certain time period. For example, a loyal customer may be a customer who has purchased at least three deals from a merchant and at least one of the deals was purchased within the last two months. In some implementations, a loyal customer may be a customer that may have opted-in to have their spending with a specific merchant tracked so as to receive spending based rewards. Spending by a loyal customer who has opted-in could be determined, for example, via third-party providers and/or via integration with point of sale systems. Thus, the deal system may determine credit card spending of a user based in part on offline purchases.

The deal engine may also calculate an estimated purchase for the deal for loyal customers. For example, the deal engine may access deal history information and use the information to calculate the estimated number of customers who may purchase the deal. In some implementations, the deal engine may calculate the estimated purchase based on the conversion rate of previously run deals for loyal customers. In some implementations, the deal may have been used before by the merchant and the deal engine calculates the estimated purchase for the current deal based on previous conversion rates. In some implementations, when the deal history information does not include conversion rate information on a deal for loyal customers, the deal engine may use a high percentage conversion rate. For example, the conversion rate for a loyal deal may be 40%, 50%, or 60%. The estimated purchase for a deal offered to loyal customers is expected to be higher than that of prospective customers and/or existing customers since loyal customers are customers who have purchased deals from the merchant in the past. The deal engine may also calculate estimated revenue for the deal for loyal customers. The estimated revenue may be based on the estimated purchase calculated by the deal engine for the deal.

The list of offers may include offers 404e that are presently being run by the merchant. The offer information may include the name of the offer and the start date of the offer. The offer information may also include the estimated send of the offer, the number of customers that purchased the offer and the number of customers who redeemed the offer thus far. The offer information also includes the estimated revenue from running the deal.

FIG. 5 illustrates an example merchant interface that shows a list of offers 502 available to a specific merchant. The list of offers may include one or more deals generated based on the loyalty level of the target customers. In some implementations, the deal engine generates one or more proposed deals based on accessed deal information, merchant information and deal history information. In these implementations, different deals may be generated for different loyalty levels of the target customers. For example deals may be generated for prospective customers, existing customers and loyal customers. As illustrated in FIG. 5, the deal engine may generate a proposed deal to prospective customers 504b. The deal generated for prospective customers may include the type of deal and the other information calculated by the deal selection module of the deal engine. The deal for prospective customers may include the estimated send for the deal, the estimated purchase and the estimated revenue. A prospective customer may be a customer who is likely to purchase a deal. In some implementations, the deal engine may use accessed deal history information and merchant information to estimate a number of prospective customers to extend the deal to. For example, prospective customers may be a follower of the merchant on a social media website, or a customer who likes the merchants' page on a social media website. Prospective customers may be customers who use the deal system to purchase deals. In other implementations, prospective customers also may be customers who use the deal system and may have expressed interest in receiving deals from the merchant. The estimated purchase for the prospective deal may be calculated by the deal engine based on deal history information. For example, the deal history information may include the number of customers offered (send) the same deal, or a similar deal in the past as well as a conversion rate. In some implementations, the conversion rate and send calculated for the same deal, or similar deals in the past may be used to calculate the estimated send and estimated purchase for the proposed deal. The proposed deal for prospective customers may also include the estimated revenue that may be calculated by using the estimated purchase and the price of the proposed deal. The proposed deal information may also include a "Add Offer" button that allows the merchant to add the offer to the current offers of the merchant. The proposed deal information may also include a "No Thanks" button that allows the merchant to decline the offer.

The deal engine may generate a proposed deal for existing customers as illustrated in FIG. 5. In some implementations, the deal proposed for existing customers may be the same deal proposed for prospective customers, like the example illustrated in FIG. 4. In other implementations, the deal proposed for existing customers may be different to the deal proposed for prospective customers, and different to the deal proposed for loyal customers. The deal proposed for existing customers may be a better value for the price than the deal proposed for prospective customers. For the example shown in FIG. 5, the deal generated for a prospective customer may be a free appetizer with dinner, and the deal generated for the existing customer may be an appetizer and wine for two for fifteen dollars. The list of offers may include a deal for loyal customers 504d. In some implementations, the deal for loyal customers would be a better deal than the deal offered to prospective and existing customers. A loyal customer may be a customer who uses the deal engine frequently and may have bought one or more deals from a specific merchant. For the example illustrated in FIG. 5, the loyal customer deal is a chef's table dining with free wine. The estimated send for the deal for loyal customers may be less than the estimated send for the prospective or existing customers.

The list of offers may include offers 504e that are presently being run by the merchant. The offer information may include the name of the offer and the start date of the offer. The offer information may also include the estimated send the offer, the number of customers that purchased the offer and the number of customers who redeemed the offer thus far. The offer information also includes the estimated revenue from running the deal.

Figure 6:
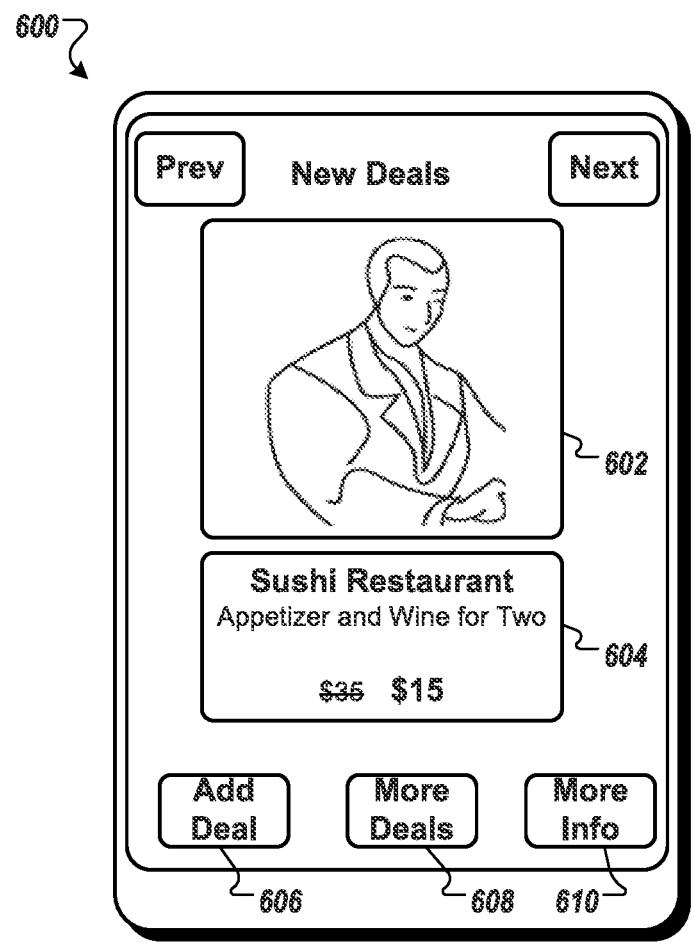
FIG. 6 illustrates an example user interface at a customer's client device.

FIG. 6 illustrates an example user interface 600 at the client device of a customer. The interface 600 may be displayed, for example, on the user device of a customer who has used the deal engine to purchase a deal from a merchant. The interface may include a picture 602 associated the merchant offering the deal on the deal engine. In some implementations, the interface may display the loyalty level of the user. For example, the user may be considered a loyal customer. The interface also displays the details about the selected deal. The deal information 604 may include the price of the deal, the price of the deal before savings, the name of the deal and the name of the merchant. The interface may also include a "add deal" button 606 that the user can select to add the deal to the user's profile. The interface also includes a "more deals" button 608 to select more deals. In some implementations, when the user selects button 608, the deal engine provides information on deals similar to the selected deal. In other implementations, when the user selects button 608, the deal engine provides information on all other deals provided by the system. The interface also includes a "more information" button 610. In some implementations, when the user selects button 610, more detailed information about the merchant and/or the selected deal is displayed. In some implementations, the information may include details about how many other customers have purchased the deal and how many more deals are available for purchase. In other implementations, the information may include the address and phone number of the merchant. Alternatively or in addition, the information may include expiry date information about the selected deal.

Figure 7:
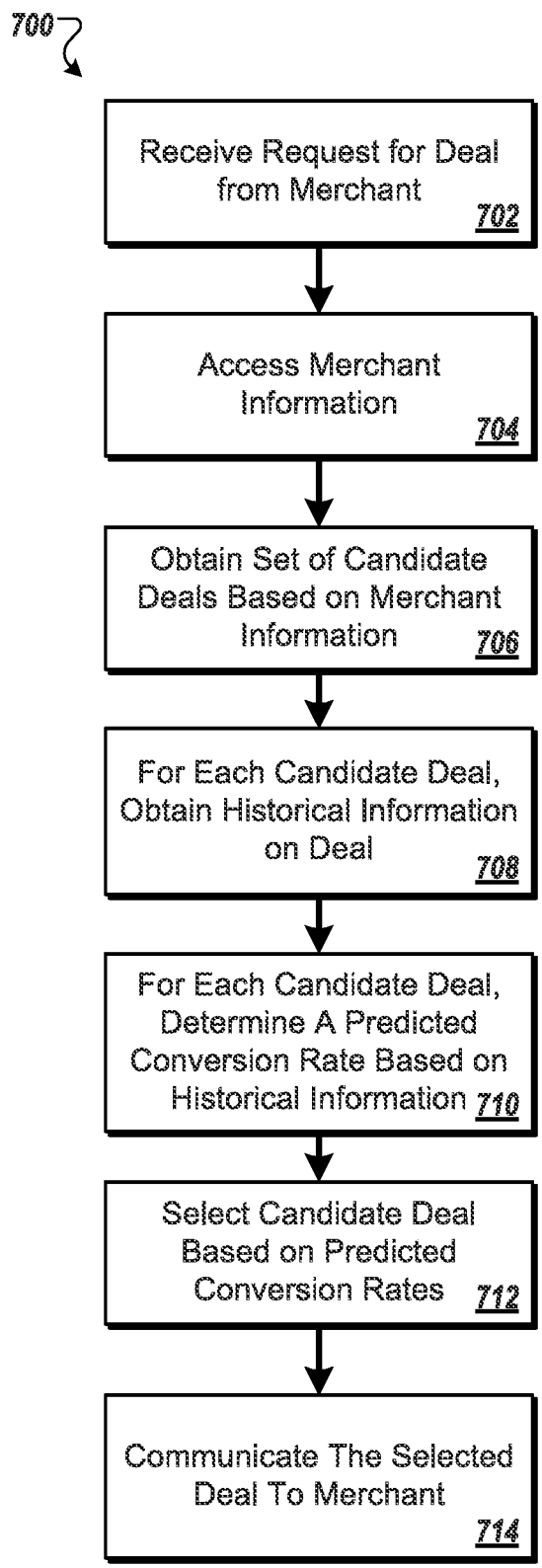
FIG. 7 is a flow chart of a method for generating and providing a customized deal to a merchant.

FIG. 7 illustrates an example process 700 for receiving a request for a deal from a merchant and generating a candidate deal for a merchant. While the steps of the process 700 are described above as occurring in a specific sequence, it should be appreciated that the steps may be performed in any suitable order. As described below, the steps of the process 700 are described as being performed by a deal engine (e.g., a server), such as, for example, the deal engine 140 described with reference to FIG. 1 and/or the deal engine 200 described with reference to FIG. 2.

Initially, in step 702, the deal engine receives a request for a deal from a client device of a merchant. The request for a deal may include a merchant identifier. Next in step 704, the deal engine accesses merchant information based on the merchant identifier. The merchant information may include a merchant category and a merchant location. In some implementations, the merchant information also includes one or more tags describing the merchant's goods and/or services. The merchant information may further include a merchant sub category. For example, the merchant category may be an Italian restaurant and fine dining sub category. The merchant information may be stored in a profile associated with the merchant stored at the deal engine.

Then, in step 706, the deal engine obtains a set of candidate deals based on the merchant information. The deal engine selects the set of candidate deals based on a variety of criteria as described above, such as the merchant category and/or sub-category. In some implementations, the deal engine may generate a variety of generic deal types and store a collection of the generic deal types. For example, the deal engine may generate a half off deal, a buy one get one half off deal a buy one get one free deal. In other implementations, the deal engine may store deals based on actual deals offered by merchants in the past. In these implementations, the deal type may be related to the category and/or sub-category of the merchant. For example, for merchants that fall under the restaurant category, the deal type may include, dinner for two, buy one entrée get a free desert etc. Another example may include if the merchant's category is vacations, the deal types may include free night stay with three night purchase, or half off winter get away.

Next, in step 708, the deal engine obtains historical information on the deal for one or more of the candidate deals. In some implementations, deal history information is stored at the deal engine. The deal history information may include deal type information for deals offered by merchants in the past. The deal history information may also include information on the number of customers that were offered the deal in the past.

Then, in step 710, the deal engine determines a predicted conversion rate based on the historical information for each candidate deal as described above. A conversion may be a purchase of the deal from the merchant. For example, the conversion rate for a deal that was offered by a merchant to 800 customers and was purchased by 200 customers is calculated to be 0.25.

Then, in step 712, the deal engine selects candidate deals based on one or more criteria such as predicted conversion rates. For example, the deal engine may select a deal having the highest predicted conversion rate. The predicted conversion rates may be determined as described above. In some implementations, the deal engine may select a deal for one or more target customer demographics based on predicted conversion rates. For example, the target customer demographics may include prospective customers, existing customers, and loyal customers. The selection of deals may be intended to transition customers between the various demographic categories. For example, the selection may be designed to transition prospective customers to become existing customers, and to transition existing customers to become loyal customers. Finally, in step 714, the deal engine communicates the selected deal to the client device of the merchant.

Some implementations may involve the deal engine obtaining information corresponding to one or more target customer demographics (e.g., characteristics such as customer loyalty and/or location). In such implementations, the historical information that the deal engine obtains for the candidate deals may include information on conversion rates of the candidate deals when these deals were offered to one or more of the target customer demographics.

In some implementations, the deal engine determines a predicted revenue for the selected deal. For example, the predicted revenue may be based on revenue from sale of the deal and/or revenue from redemption of the deal. In such implementations, the deal engine may transmit data describing the predicted revenue to the merchant's client device, for example in a webpage response to the client device.

The features described can be implemented in digital electronic circuitry, or in computer hardware, firmware, software, or in combinations of them. The apparatus can be implemented in a non-transitory computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a client device having a display device such as a LCD (liquid crystal display) for displaying information to the user and a touchscreen (e.g., a presence-sensitive display) and/or a keyboard and a pointing device such as a mouse or a trackball by which the user can provide input to the client device. In some versions, the client device may also include a dialog based voice interface for interaction with a user.

The features can be implemented in a system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A method comprising:
receiving, from a website, via network, via a user interface configured for display at a client device of a merchant, at a merchant account module and from the client device of the merchant, a request for generating a deal webpage, the request including a merchant identifier that identifies the merchant;
accessing, by the merchant account module, merchant information based on the merchant identifier, the merchant information including a merchant category and a merchant location;
outputting the merchant information to an offer structure module and a deal history module;
determining, by the offer structure module, a type of customer offer that matches the merchant information;
obtaining, by the offer structure module, and outputting to the deal history module: (i) a set of candidate customer offers corresponding to the determined type of customer offer that matches the merchant information based on the merchant identifier in the received request, and (ii) configuration information for structuring customer offers included in the set of candidate customer offers;

for each candidate customer offer, obtaining, by the deal history module, historical information on the respective candidate customer offer, the historical information including one or more conversion rates of the candidate customer offer when the candidate customer offer was previously offered by one or more other merchants;

for each candidate customer offer, determining, by the deal history module, a predicted conversion rate based on the historical information for the respective candidate customer offer by identifying each of a plurality of occasions a particular deal was offered, and an associated historical conversion rate for each type of customer at each of the plurality of occasions, applying a weighting to the historical conversion rate for each type of customer at each of the plurality of occasions in accordance with a geographic distance from a location of the candidate offer, and utilizing each weighted historical conversion rate for each type of customer at each of the plurality of occasions to calculate the predicted conversion rate by type of customer;

for each candidate customer offer, outputting, by the deal history module to a deal selection module, the configuration information, the historical information, and the predicted conversion rate;

selecting, at the deal selection module, a customer offer from the set of candidate customer offers based on the predicted conversion rates for the set of candidate customer offers;

generating, at the deal selection module, the deal webpage based on the merchant information, the configuration information of the selected customer offer, and the predicted conversion rate for the selected customer offer; and providing, from the deal selection module to the client device of the merchant, the deal webpage, the deal webpage comprising the selected customer offer and the predicted conversion rate for the selected customer offer, wherein the deal webpage is configured for display at the client device of the merchant integrated with a point-of-sale device.

2. The method of claim 1, wherein the configuration information includes information indicative of pricing data associated with the customer offers included in the set of candidate customer offers and types of the customer offers included in the set of customer offers.

3. The method of claim 1, wherein the historical information on the respective candidate customer offer further comprises one or more identities of the one or more other merchants that previously offered the respective candidate customer offer.

4. The method of claim 1, wherein the deal webpage that is provided, from the deal selection module to the client device of the merchant, further comprises at least two buttons, configured for selection, one of the two buttons configured to add the selected customer offer to a list of current offers being offered by the merchant and the second of the two buttons configured to provide an indication declining the selected customer offer.

5. The method of claim 1, wherein the merchant information comprises the merchant category, the merchant location, and one or more tags for the merchant; and wherein the obtained and outputted set of candidate customer offers corresponds to the determined type of customer offer that matches the merchant information based on the merchant category, the merchant location, and the one or more tags for the merchant.

6. The method of claim 1, wherein the merchant information comprises the merchant category, a merchant sub-category, the merchant location, and one or more tags for the merchant; and wherein the obtained and outputted set of candidate customer offers corresponds to the determined type of customer offer that matches the merchant information based on the merchant category, the merchant sub-category, the merchant location, and the one or more tags for the merchant.

7. The method of claim 1, further comprising:
obtaining, by the deal history module, information corresponding to one or more target customer demographics, wherein, for each candidate customer offer, the obtained historical information includes one or more conversion rates of the candidate customer offer when the candidate customer offer was previously offered by one or more other merchants to one or more of the target customer demographics.

8. The method of claim 1, further comprising:
wherein selecting, at the deal selection module, the customer offer from the set of candidate customer offers based on the predicted conversion rates for the set of candidate customer offers comprises selecting, at the deal selection module, a customer offer for each of the one or more target demographics based on the predicted conversion rates for the set of candidate customer offers; and wherein outputting, from the deal selection module to the client device of the merchant, the generated data corresponding to the deal webpage comprises communicating, from the deal selection module to the client device of the merchant, generated data corresponding to generated deal webpages for each of the one or more target demographics.

9. An apparatus comprising at least one processor and at least one memory including computer program code, the at least one memory and the computer program code configured to, with the processor, cause the apparatus to at least:

receive, from a website, via network, via a user interface configured for display at a client device of a merchant, at a merchant account module and from the client device of the merchant, a request for generating a deal webpage, the request including a merchant identifier that identifies the merchant;

access, by the merchant account module, merchant information based on the merchant identifier, the merchant information including a merchant category and a merchant location;

output the merchant information to an offer structure module and a deal history module;

determine, by the offer structure module, a type of customer offer that matches the merchant information;

obtain, by the offer structure module, and outputting to the deal history module: (i) a set of candidate customer offers corresponding to the determined type of customer offer that matches the merchant information based on the merchant identifier in the received request, and (ii) configuration information for structuring customer offers included in the set of candidate customer offers;

for each candidate customer offer, obtain, by the deal history module, historical information on the respective candidate customer offer, the historical information including one or more conversion rates of the candidate customer offer when the candidate customer offer was previously offered by one or more other merchants;

for each candidate customer offer, determine, by the deal history module, a predicted conversion rate based on the historical information for the respective candidate customer offer by identifying each of a plurality of occasions a particular deal was offered, and an associated historical conversion rate for each type of customer at each of the plurality of occasions, applying a weighting to the historical conversion rate for each type of customer at each of the plurality of occasions in accordance with a geographic distance from a location of the candidate offer, and utilizing each weighted historical conversion rate for each type of customer at each of the plurality of occasions to calculate the predicted conversion rate by type of customer;

for each candidate customer offer, output, by the deal history module to a deal selection module, the configuration information, the historical information, and the predicted conversion rate;

select, at the deal selection module, a customer offer from the set of candidate customer offers based on the predicted conversion rates for the set of candidate customer offers;

generate, at the deal selection module, the deal webpage based on the merchant information, the configuration information of the selected customer offer, and the predicted conversion rate for the selected customer offer; and provide, from the deal selection module to the client device of the merchant, the deal webpage, the deal webpage comprising the selected customer offer and the predicted conversion rate for the selected customer offer, wherein the deal webpage is configured for display at the client device of the merchant integrated with a point-of-sale device.

10. The apparatus of claim 9, wherein the configuration information includes information indicative of pricing data associated with the customer offers included in the set of candidate customer offers and types of the customer offers included in the set of customer offers.

11. The apparatus of claim 9, wherein the historical information on the respective candidate customer offer further comprises one or more identities of the one or more other merchants that previously offered the respective candidate customer offer.

12. The apparatus of claim 9, wherein the deal webpage that is provided, from the deal selection module to the client device of the merchant, further comprises at least two buttons, configured for selection, one of the two buttons configured to add the selected customer offer to a list of current offers being offered by the merchant and the second of the two buttons configured to provide an indication declining the selected customer offer.

13. The apparatus of claim 9, wherein the merchant information comprises the merchant category, the merchant location, and one or more tags for the merchant; and wherein the obtained and outputted set of candidate customer offers corresponds to the determined type of customer offer that matches the merchant information based on the merchant category, the merchant location, and the one or more tags for the merchant.

14. The apparatus of claim 9, wherein the merchant information comprises the merchant category, a merchant sub-category, the merchant location, and one or more tags for the merchant; and wherein the obtained and outputted set of candidate customer offers corresponds to the determined type of customer offer that matches the merchant information based on the merchant category, the merchant sub-category, the merchant location, and the one or more tags for the merchant.

15. The apparatus of claim 9, wherein the at least one memory and the computer program code are further configured to, with the processor, cause the apparatus to:

obtain, by the deal history module, information corresponding to one or more target customer demographics, wherein, for each candidate customer offer, the obtained historical information includes one or more conversion rates of the candidate customer offer when the candidate customer offer was previously offered by one or more other merchants to one or more of the target customer demographics.

16. The apparatus of claim 9, wherein selecting, at the deal selection module, the customer offer from the set of candidate customer offers based on the predicted conversion rates for the set of candidate customer offers comprises selecting, at the deal selection module, a customer offer for each of the one or more target demographics based on the predicted conversion rates for the set of candidate customer offers; and wherein outputting, from the deal selection module to the client device of the merchant, the generated data corresponding to the deal webpage comprises communicating, from the deal selection module to the client device of the merchant, generated data corresponding to generated deal webpages for each of the one or more target demographics.

17. A computer program product comprising at least one non-transitory computer-readable storage medium having computer-executable program code instructions stored therein, the computer-executable program code instructions comprising program code instructions for:

receiving, from a website, via network, via a user interface configured for display at a client device of a merchant, at a merchant account module and from the client device of the merchant, a request for generating a deal webpage, the request including a merchant identifier that identifies the merchant;

accessing, by the merchant account module, merchant information based on the merchant identifier, the merchant information including a merchant category and a merchant location;

outputting the merchant information to an offer structure module and a deal history module;

determining, by the offer structure module, a type of customer offer that matches the merchant information;

obtaining, by the offer structure module, and outputting to the deal history module: (i) a set of candidate customer offers corresponding to the determined type of customer offer that matches the merchant information based on the merchant identifier in the received request, and (ii) configuration information for structuring customer offers included in the set of candidate customer offers;

for each candidate customer offer, obtaining, by the deal history module, historical information on the respective candidate customer offer, the historical information including one or more conversion rates of the candidate customer offer when the candidate customer offer was previously offered by one or more other merchants;

for each candidate customer offer, determining, by the deal history module, a predicted conversion rate based on the historical information for the respective candidate customer offer by identifying each of a plurality of occasions a particular deal was offered, and an associated historical conversion rate for each type of customer at each of the plurality of occasions, applying a weighting to the historical conversion rate for each type of customer at each of the plurality of occasions in accordance with a geographic distance from a location of the candidate offer, and utilizing each weighted historical conversion rate for each type of customer at each of the plurality of occasions to calculate the predicted conversion rate by type of customer;

for each candidate customer offer, outputting, by the deal history module to a deal selection module, the configuration information, the historical information, and the predicted conversion rate;

selecting, at the deal selection module, a customer offer from the set of candidate customer offers based on the predicted conversion rates for the set of candidate customer offers;

generating, at the deal selection module, the deal webpage based on the merchant information, the configuration information of the selected customer offer, and the predicted conversion rate for the selected customer offer; and providing, from the deal selection module to the client device of the merchant, the deal webpage, the deal webpage comprising the selected customer offer and the predicted conversion rate for the selected customer offer, wherein the deal webpage is configured for display at the client device of the merchant integrated with a point-of-sale device.

18. The computer program product of claim 17, wherein selecting, at the deal selection module, the customer offer from the set of candidate customer offers based on the predicted conversion rates for the set of candidate customer offers comprises selecting, at the deal selection module, a customer offer for each of the one or more target demographics based on the predicted conversion rates for the set of candidate customer offers; and wherein outputting, from the deal selection module to the client device of the merchant, the generated data corresponding to the deal webpage comprises communicating, from the deal selection module to the client device of the merchant, generated data corresponding to generated deal webpages for each of the one or more target demographics.

\* \* \* \* \*